United States Patent [19]
Peeters et al.

[11] Patent Number: 5,634,342
[45] Date of Patent: Jun. 3, 1997

[54] ELECTRONIC HOUSEHOLD PLANT WATERING DEVICE

[76] Inventors: John P. Peeters, 4607 Harling La., Bethesda, Md. 20814; Larry W. Berkbigler, 456 Aragon Ave., Los Alamos, N.M. 87544

[21] Appl. No.: 577,732

[22] Filed: Dec. 22, 1995

[51] Int. Cl.⁶ ............... F25B 21/02; A01G 25/00
[52] U.S. Cl. ................................. 62/3.4; 47/79
[58] Field of Search ............... 62/3.2, 3.4, 3.7, 62/271, 331; 47/66, 79, 48.5

[56] References Cited

U.S. PATENT DOCUMENTS

| | | |
|---|---|---|
| 2,944,404 | 7/1960 | Fritts ................................ 62/3 |
| 3,050,948 | 8/1962 | Jones ............................. 62/3.4 |
| 4,315,599 | 2/1982 | Biancardi ....................... 62/3.4 |
| 4,506,510 | 3/1985 | Tircot ............................. 62/3.4 |
| 5,020,261 | 6/1991 | Lishman .......................... 47/79 |
| 5,351,437 | 10/1994 | Lishman ........................ 47/79 |
| 5,444,984 | 8/1995 | Carson ........................... 62/3.4 |

FOREIGN PATENT DOCUMENTS

| | | | |
|---|---|---|---|
| 214766A1 | 3/1987 | European Pat. Off. ............ 4/9 |
| 272218A | 10/1989 | Germany ......................... 4/51 |

*Primary Examiner*—William Doerrler
*Attorney, Agent, or Firm*—Dykema Gossett PLLC

[57] ABSTRACT

A compact electronic device automatically waters household plants by collecting ambient air moisture. The device utilizes the Peltier effect to condense atmospheric moisture which is used in a controlled manner to supply water to a plant. The device includes a thermoelectric module, a microcontroller, a micro-fan, a moisture sensitive probe and an external power supply.

16 Claims, 2 Drawing Sheets

ELECTRONIC HOUSEHOLD PLANT WATERING DEVICE

TECHNOLOGICAL FIELD

The present invention relates generally to methods and apparatus for watering plants and, more specifically, to automatic plant watering devices.

BACKGROUND OF THE INVENTION

Cultivated plants have long been used in the home, office and other buildings in order to beautify the surroundings. More recently, a number of health benefits have been attributed to the presence of household plants. Generally, all household plants must be periodically watered in order to maintain plant growth. The frequency of watering which is required varies with the plant, the soil characteristics and the environment. It is known that one of the principal causes of plant death is due to an improper watering regime resulting from inadequate or excessive watering.

European patent number 87-074115/11 describes a plant cover roofing which collects water and supplies it to underlying plants in a controlled manner. U.S. Pat. No. 5,020,261, entitled, "MOISTURE SENSITIVE SELF-WATERING PLANTER" discloses a moisture sensitive self-watering planter having a control valve that controls the flow of water to the plant. The control valve is actuated in response to a decrease in the weight of the soil as the soil loses moisture. U.S. Pat. No. 5,351,437, entitled "MOISTURE SENSITIVE IRRIGATION CONTROL SYSTEM," discloses a similar weight-based control system for actuating a water valve. None of these prior art patents discloses an automatic plant watering device as provided by the present invention.

SUMMARY OF THE INVENTION

The present invention is based in part on the fact that a thermoelectric module (Peltier principle) can be cooled beyond the dew point and can collect moisture from ambient air. Therefore ambient air moisture can be used as a direct water source for household plants.

In one aspect, the present invention provides a self-watering device for household plants comprising at least one thermoelectric module to allow condensation of moisture from the air. Each thermoelectric module includes one cold plate to condense air moisture and one heat sink to dissipate heat. A micro-fan is provided which cools the heat sink.

In another aspect a microcontroller is provided which permits overall control of the system. In one embodiment, the microcontroller has a timer to ensure that adequate soil moisture is attained within a reasonable time period.

In another aspect of the present invention a probe is provided which continuously measures soil water content and controls a main override switch for the thermoelectric module, shutting off the power to the device and the micro-fan once the desired level of soil moisture is attained.

In one aspect, the present invention allows the collected moisture to be automatically regulated on a continuous basis by controlling the operation of the thermoelectric module with a microcontroller in conjunction with a soil moisture probe, thereby ensuring optimal plant growth with little or no maintenance.

In another aspect, the microcontroller produces a warning signal which indicates that additional (external) water should be added.

Thus, it is an object of the present invention to eliminate or substantially reduce the need for periodic watering of a potted plant.

It is a further object of the present invention to ensure that the level of soil moisture in a household plant is adequate and is continuously monitored and regulated.

BRIEF DESCRIPTION OF THE DRAWINGS

FIG. 3 of the drawings is a cross section along lines 3—3 of FIG. 1.

DETAILED DESCRIPTION OF THE PREFERRED EMBODIMENTS

Figure 1:
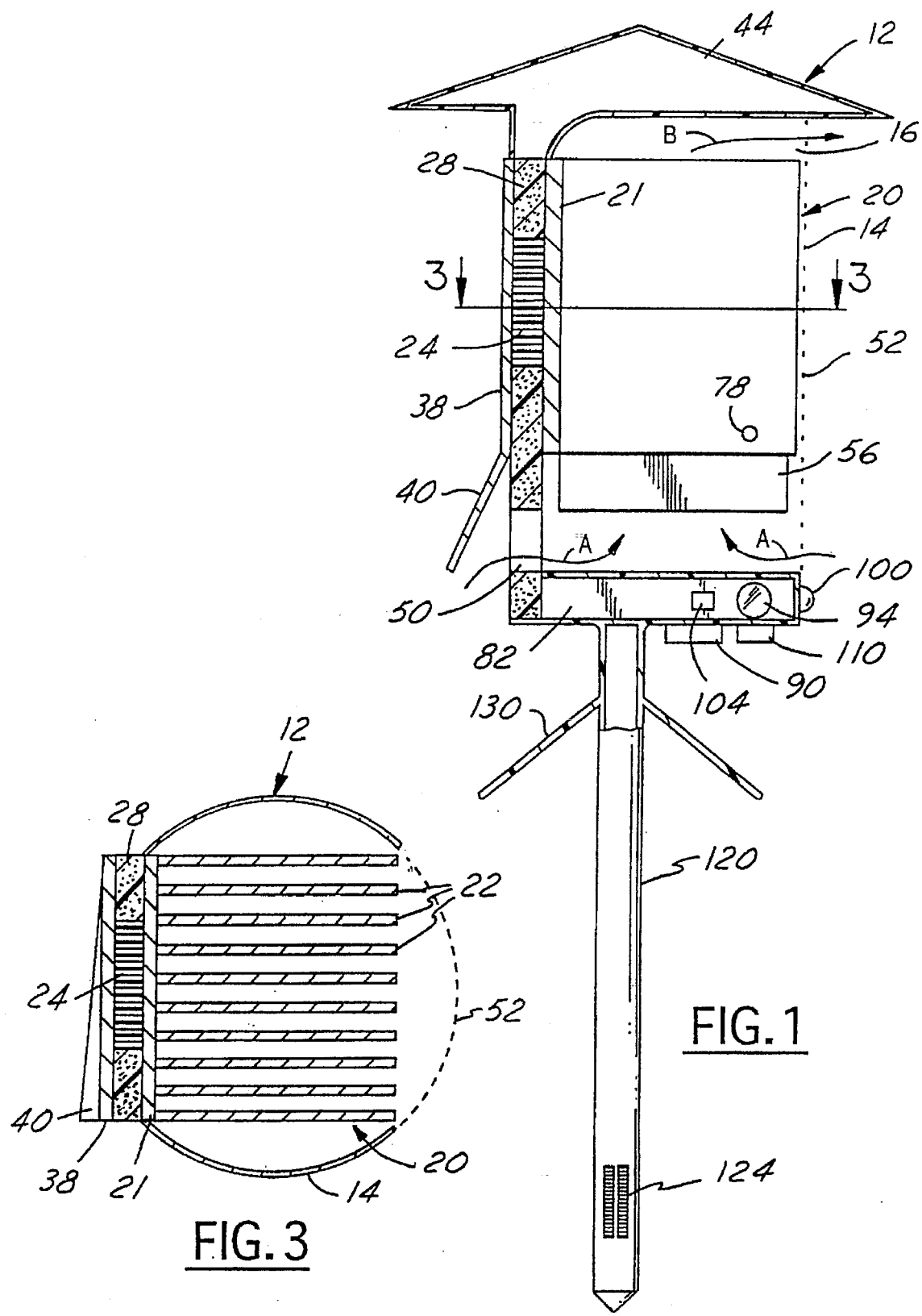
FIG. 1 is a side elevational cross-section of the automatic plant watering device in one embodiment.

Referring now to FIGS. 1 and 3 of the drawings, electronic plant watering device 12 has housing 14 that defines chamber 16 in which heat sink 20 is disposed. The overall dimensions of housing 14 may vary greatly not only in terms of size but also shape and may be ornamental in nature. A number of configurations are suitable for heat sink 20. In FIG. 3 metal plate 21 is shown having multiple fins 22. In general, multiple cooling fins fixed in the conventional manner to optimize heat transfer from thermoelectric module 24 are preferable in most applications, although other heat dissipation means or configurations may be suitable.

Thermoelectric module 24 is tightly imbedded within insulation plate 28. Plate 28 is preferably formed of a highly insulating plastic material such as closed-cell foam insulation and should form a seal around module 24. On the outer surface of thermoelectric module 24 and in heat transfer contact therewith, external or cold plate 38 (cold side) is seen which allows direct condensation of air moisture on the surface thereof as plate 38 is cooled by module 24. Cold plate 38 has moisture run-off slope 40 to direct the flow of water condensation thereon, as will be more fully explained hereinafter. Slope 40 may lead to a water reservoir (not shown) having a valve which is actuated automatically. In an alternative embodiment (not shown), cold plate 38 ends in a V-shape with a slight bend away from the unit to further help divert the moisture away from device 12. Cold plate 38 may include small grooves or fins (not shown) or the like to optimize surface area for condensation.

Heat sink 20 and cold plate 38 are typically formed of metal which is an excellent heat conductor. Most preferred are copper or aluminum or the like. The surface ratio of heat sink 20 to cold plate 38 and/or the thermal characteristics of the materials used to form the plates is such that the cold plate is maintained well below ambient temperature when actuated. Typically the thermal resistance between heat sink 20 and ambient will be well below 2° C. per watt. For a device with a single thermoelectric module, cold plate 38 will typically have a surface area which is somewhat greater than 6 square inches. It will be appreciated that heat sink 20 and cold plate 38 are attached to the thermoelectric module in the standard way known to those skilled in the art.

In some applications, in order to provide for greater moisture recovery it may be preferable to utilize multiple thermoelectric modules and these can be placed on opposing sides of a larger common heat sink, provided the heat sink surface area is sufficient to maintain the cold plates well below ambient temperature, i.e. typically at least 20° C. below ambient. When two or more thermoelectric modules are used these are typically wired in series.

Airflow in and around electronic plant watering device 12 should be maximized not only to achieve efficient heat dissipation by heat sink 20 but also to maximize air contact (and thus moisture collection) on plate 38. In one design, chamber 16 is covered by cap 44 which is formed of plastic or the like. Cap 44 functions to deflect the heat of heat sink 20 away from device 12 and also to protect device 12 from any externally applied water in the event that supplemental watering is required.

A large air intake opening 50 is provided in housing 14 at the bottom of chamber 16. Screen 52 with large openings to protect the unit without hindering airflow is preferably provided as one wall of housing 14. External air is drawn into air intake hole 50 and screen 52, forced through the cooling fins by means of an optional electric blower 56 in the direction of arrows A and exits via the top of device 12 as shown by arrow B. In order to minimize noise and vibration, blower 56 can be mounted on noise absorbing materials such as rubber or the like. In the event that a blower is not utilized, it may be preferable to increase the size of heat sink 20 which may require additional structural support.

Thermistor 78 is shown attached to heat sink 20 to prevent overheating of thermoelectric module 24. Depending on the location of this thermistor, it may also be used to detect freezing of the cold plate. Alternatively, a second thermistor (not shown) may also be added to the device. If overheating is detected, power will be disconnected from the blower and the thermoelectric module and a warning system can be activated as described below. If freezing is detected, power will be disconnected for several minutes from the blower and the thermoelectric module to allow thawing. The temperature of cold plate 38 can be maintained constant by modifying the speed of blower 56 with an electronic control which regulates the voltage to the blower in order to maintain a temperature slightly above 0° C. Alternatively, the cold plate can be cycled below and above this temperature as described above.

At the floor of housing 14, a microcontroller 82 is preferably provided to measure the watering pattern versus time and, most preferably, to actuate an audible low water condition alarm 90 in case the collected moisture is insufficient for the plant's needs due to the external humidity conditions. Microcontroller 82 preferably includes a clock to ensure that adequate soil moisture is attained within a reasonable time period. Alarm 90 is further preferably controlled by photocell 94 which prevents alarm 90 from sounding at night. The alarm provides a pleasing tone or series of tones such that the alarm is not annoying to the owner of the device. A visual alarm depicted as external LED 100, can also be included in lieu of, or in addition to, the audible alarm as a means to gage the watering status or to indicate a problem such as overheating.

In addition, a relative humidity sensor (not shown) may also be added to the unit as part of a further control system to both inactivate device 12 in very low humidity conditions and to activate one of the switches for the alarm.

In a preferred embodiment, soil moisture selector switch 104 is provided which permits selection of the approximate level of moisture desired within the soil. Typically, a minimum of three settings (low, medium and high) is provided with low corresponding to the level of moisture needed for plants with a low water demand such as cacti and high corresponding to plants with a high water need such as tropical plants. In the absence of this control, the watering level for the device is set to that typically needed for most household plants (moderate watering).

External power is provided via power connector 110. Typically when a single thermoelectric module is used, the unit operates at approximately 9 Volts DC and the power is provided by an AC transformer which plugs directly into the building mains. For a small unit with a single thermoelectric module, the typical rating of the transformer is approximately 1 Amp. Several suppliers can provide the thermoelectric modules. For a unit with a single thermoelectric module, unit number CP0.8-127-06L from the Melcor Corporation of Trenton, N.J. may be used, although other suppliers may provide the acceptable units. The details of operation of thermoelectric dehumidifiers are described in U.S. Pat. Nos. 3,050,948 and 2,944,404, the entire disclosures of which are incorporated herein by reference.

In one preferred design, electronic plant watering device 12 is held within the pot of a household plant by means of a long and narrow support stake 120 which includes soil moisture sensing contacts 124 and thus functions as a probe as well as a support. That is, support stake 120 acts as a probe (preferably built in plastic, stainless steel or the like) with two small electrodes or contacts 124 at its tip which sense moisture content of the soil. This probe provides a means to continuously measure soil water content and serves to control the main override switch for the thermoelectric module, shutting off the power to the device and the micro-fan once the desired level of soil moisture is attained. In one design, the probe forms an integral part of the unit and provides a means to support the unit above the soil; however, the probe may be a discrete element attached by wires or the like, as stated more fully below.

Stake 120 also preferably has an inverted cone 130 to help anchor the device in the soil at a proper height. Since the depth of a household flower pot is usually proportional to its volume, the length of the probe can be made to correspond to the overall power and watering capacity of the device. As stated, in order to provide a sufficient amount of moisture to larger plants, it may be necessary to use two or more thermoelectric modules. Larger devices may also include more than one probe and/or supports and be of a different design altogether. It will be appreciated from the present disclosure that thermoelectric module 24, cold plate 38, heat sink 20, blower 56 and the electronic controls can be mounted separately from the probe. In this case a convenient attachment mechanism such as clamps (not shown) are provided. This type of design is ideal for smaller rectangular pots, although the unit is designed to clip onto any pot.

Figure 4:
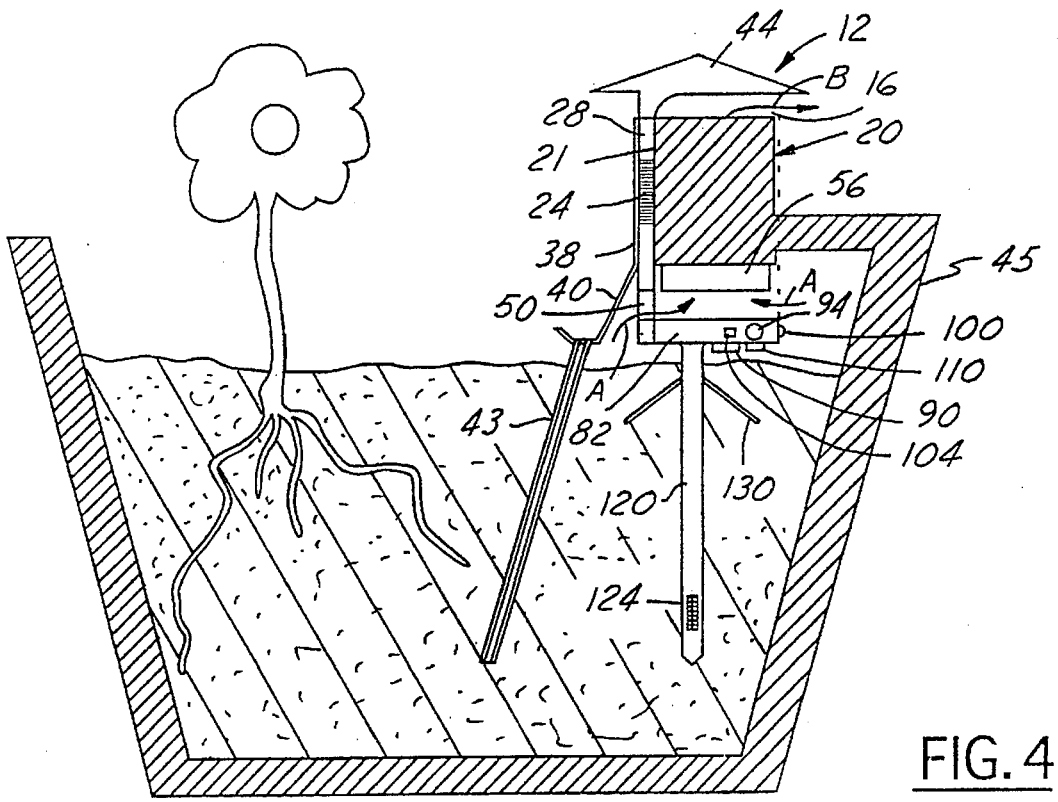
FIG. 4 of the drawings is a side elevational view of the automatic plant watering device in an alternate configuration.

In another preferred embodiment, and referring now to FIG. 4 of the drawings, the flower pot 45 itself or, alternatively, a flower pot cover may serve as the heat sink and would be composed of a highly conductive material such as copper or the like. In this alternative embodiment the thermoelectric module would be mounted directly on the pot or pot cover and would include a small moisture collection chamber 41 under the cold plate. A tube 43 which irrigates the bottom of the pot or pot cover would be connected to this chamber. The overall principles described above would otherwise apply, except that a micro-fan may no longer be necessary.

Figure 2:
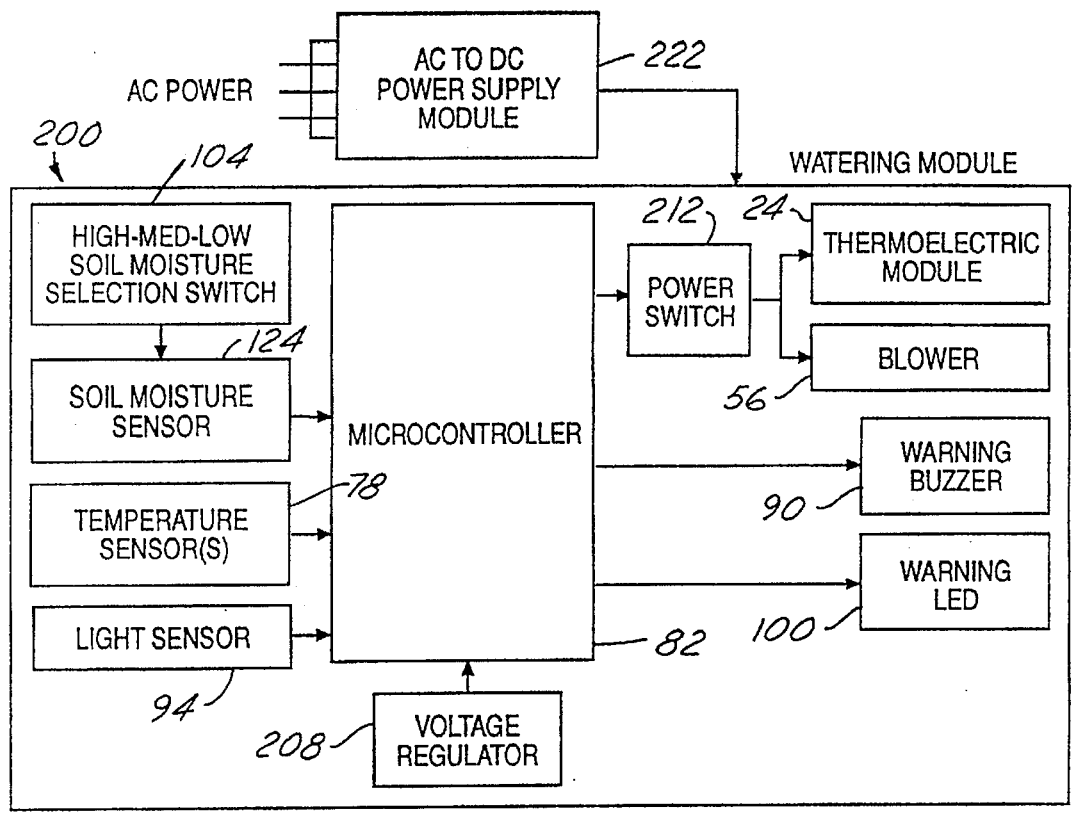
FIG. 2 is a control diagram for the device shown in FIG. 1 of the drawings.

Referring now to FIG. 2 of the drawings, the preferred control configuration 200 is shown. The electronic controls for this device can easily be constructed using standard and widely available components. More specifically, the microcontroller is shown receiving input signals from the various probes, i.e. soil moisture sensor 124, temperature sensor 78 and light sensor 94. As stated above, the soil moisture sensor is set by variable soil moisture selection switch 104. The microcontroller 82 controls power switch 212, which controls power to the blower 56 and thermoelectric module 24. The microcontroller also controls the audible alarm 90 and the visual alarm 100. Power supply 222 is also shown together with voltage regulator 208.

In operation, using the well known Peltier effect, thermoelectric module 24 is activated in response to a low moisture condition sensed by moisture sensor 124. Plate 38 is rapidly cooled causing moisture from the ambient air to collect on plate 38 in the form of drops which flow under the force of gravity over the surface of slope 40. Water droplets fall from the edge of slope 40 into the plant soil, thereby providing necessary moisture to the plant. In the event that water freezes on plate 38, the device can be cycled using the input from the temperature sensor(s) in order to allow the ice to melt and flow as water droplets down slope 40.

Thus, the present invention further allows the collected moisture to be automatically regulated on a continuing basis by controlling the operation of the thermoelectric module with a microcontroller combined with a soil moisture probe, thereby ensuring optimal plant growth with little or no maintenance. The invention can be used in connection with slow release fertilizers so that household plants would require virtually no maintenance and would grow optimally due to a perfect soil moisture balance. Since the invention is in an autonomous self-contained and aesthetically pleasing unit it can easily be concealed within the pot behind the plant. Alternatively it can be built directly into the pot or pot cover.

In areas or households where the relative humidity is frequently low larger units may be required because insufficient moisture will otherwise be collected. Experimental results show that a unit with a single thermoelectric module can typically collect enough air moisture to water a small plant. The electricity used for such a unit is about 25 watts or approximately ⅓ to ¼ the average electricity used for a single household lamp.

Thus, it is apparent that there has been provided in accordance with the invention a method and apparatus that fully satisfies the objects, aims and advantages as set forth above. While the invention has been described in connection with specific embodiments thereof, it is evident that many alternatives, modifications, and variations will be apparent to those skilled in the art in light of the foregoing description. Accordingly, it is intended to embrace all such alternatives, modifications and variations that fall within the spirit and broad scope of the appended claims.

What is claimed is:

1. An electronic device to automatically water household plants, comprising:

a housing;

at least one thermoelectric module in association with said housing;

at least one heat sink for dissipating heat generated by said thermoelectric module;

at least one cold plate for condensing moisture through the action of said thermoelectric module;

at least one probe to measure soil water content; and a low water alarm for signaling a low water condition.

2. The invention recited in claim 1, further comprising a microcontroller.

3. The invention recited in claim 1, wherein said probe is combined with said housing into a single unit.

4. The invention recited in claim 1, wherein said probe is independent from said housing.

5. The invention recited in claim 1, further comprising at least one thermistor in association with said thermoelectric module.

6. The invention recited in claim 1, further comprising at least one LED.

7. The invention recited in claim 1, further including a power supply.

8. The invention recited in claim 7, wherein the power supply is an AC transformer.

9. The invention recited in claim 1, further comprising a photocell to interrupt said low water alarm.

10. The invention recited in claim 1, further comprising at least one micro fan to cool the heat sink and increase air flow in and around the housing.

11. The invention recited in claim 1, further comprising a hygrometer.

12. The invention recited in claim 1, further comprising at least one electronic voltage control for varying the speed of the blower.

13. A water-generating device to automatically water household plants, comprising:

a heat conducting flower pot serving as a heat sink;

at least one thermoelectric module;

at least one cold plate for the condensation of moisture;

at least one small chamber to collect moisture from said cold plate;

at least one microcontroller for controlling said thermoelectric module;

at least one probe to measure soil water content;

at least one thermistor for detecting the thermal condition of said device; and means for providing power to said device.

14. A water-generating device to automatically water household plants, comprising:

a heat conducting flower pot cover serving as a heat sink;

at least one thermoelectric module;

at least one cold plate for the condensation of moisture;

at least one small chamber to collect moisture from said cold plate;

at least one microcontroller for controlling said thermoelectric module;

at least one probe to measure soil water content;

at least one thermistor for detecting the thermal condition of said device: and means for providing power to said device.

15. A self-standing electronic device to water household plants from moisture in the air, comprising:

a housing;

at least one thermoelectric module;

at least one heat sink in association with said thermoelectric module;

at least one cold plate in association with said thermoelectric module;

at least one probe to measure soil water condition;

a microprocessor in communication with said thermoelectric module for controlling said thermoelectric module; and a blower for moving air across said heat sink to dissipate heat from said heat sink.

16. A self-standing electronic device to water household plants from moisture in the air, comprising:

a housing;

at least one thermoelectric module;

at least one heat sink in association with said thermoelectric module;

at least one cold plate in association with said thermoelectric module;

at least one probe to measure soil water condition, said probe further serving as a support structure for said self-standing electronic device;

a microprocessor in communication with said probe and said thermoelectric module for controlling said thermoelectric module based on measurements by said probe, said microcontroller further including a clock;

a blower for moving air across said heat sink to dissipate heat from said heat sink;

a low-water alarm having an LED readout and an audible alarm;

a soil moisture selection switch;

a thermistor is association with said thermoelectric module; and a light sensor in communication with said microcontroller.

* * * * *